Patented Aug. 24, 1943

2,327,595

UNITED STATES PATENT OFFICE 2,327,595

PRINTING INK

Donald Robert Erickson and Paul J. Thoma, Kalamazoo, Mich.

No Drawing. Application August 11, 1941, Serial No. 406,399

2 Claims. (Cl. 106—30)

This invention relates to improvements in printing ink.

This invention relates to printing inks and pigments particularly adapted for use therein. It relates particularly to an improved alkali blue pigment and to inks made with this pigment and with a liquid polyglycol as a solvent and with resins consisting of rosin or a terpene hydrocarbon of the formula $C_{10}H_{16}$ such as alpha terpinene modified with an alpha beta unsaturated organic polybasic acid such as maleic or fumaric, which ink has water tolerance so that it will not set up on the press, even when high humidities are encountered, but which may be treated with water after printing to prevent offset, the water serving to separate resin at the surface of the printed film from the solvent used in the ink to form a hard non-offsetting film.

It has for its objects:

First, to provide a new and improved alkali blue pigment.

Second, to provide such a pigment which does not have the characteristic alkali blue bronze and which is clear and clean in appearance.

Third, to provide a new and improved ink of the class described which is workable and stable in that it does not get hard, as is characteristic of alkali blue pigmented inks of the above described type.

Fourth, to provide such an ink with an improved body.

Fifth, to provide such an ink in which the water tolerance characteristic of inks using the aforesaid resins and a polyglycol is not cut down.

Other objects and advantages pertaining to details and economies will appear from the description to follow.

In carrying out the invention, alkali blue is resinated with a resin comprising either a rosin or a terpene hydrocarbon of the formula $C_{10}H_{16}$ modified with an alpha beta unsaturated organic polybasic acid such as maleic or fumaric. The modified resin may be obtained commercially under the trade name "Teglac 127." The modified terpene hydrocarbon may be obtained commercially under the trade name "Petrex Acid."

The resination of the pigment is done in the pulp state in substantially the same way as pigments are resinated with rosin. The pigment in the pulp state is thoroughly mixed with the sodium soap of the resin or with an alcohol solution of the resin. Up to equal weights on a dry basis of the resin and the pigment are used. The resin is then precipitated and the resinated pigment is dried and ground. It is then incorporated in the usual way in the varnish.

The improved ink preferably consists of a varnish consisting of 50 parts by weight of diethylene glycol or some other liquid polyglycol, and 50 parts by weight of either the rosin or the terpene hydrocarbon modified as above set forth by the alpha beta unsaturated organic polybasic acid such as maleic or fumaric. A mixture of these resins may be employed, either in the resination or in the varnish as the binder for the ink.

The amount of pigment varies with the desired density of color. Usual practices in pigmenting varnishes to make inks apply.

The new and improved pigment is particularly desirable because the resination cleans it up. The usual bronze of alkali blue is materially reduced. The ink will remain workable for considerable periods of time and much longer than a similar ink made with an alkali blue pigment which has not been resinated in this manner. The ink retains the characteristic water tolerance and the property of being suitable for use in connection with the water treatment aforesaid after printing to prevent offset. The water tolerance is not cut down by using the improved resinated pigment as would be the case if an alkali blue resinated with rosin were employed.

The terms and expressions which have been herein employed are used as terms of description and not of limitation, and there is no intention, in the use of such terms and expressions, of excluding any equivalents of the features shown and described. It is recognized that various modifications are possible within the scope of the invention claimed.

Having thus described our invention, what we claim as new and desire to secure by Letters Patent is:

1. A non-offsetting printing ink having a high water tolerance comprising a varnish comprising a liquid polyglycol as a solvent for the resin, and a resin selected from the group consisting of rosin modified with an alpha beta unsaturated organic polybasic acid and a terpene hydrocarbon of the formula $C_{10}H_{16}$ modified by an alpha beta unsaturated organic polybasic acid and in sufficient amount to form, when subjected to steam immediately after printing, a thin hard film of resin over the exposed surfaces of the printed film, and a pigment comprising alkali blue resinated with an equal amount by weight of a resin selected from the group consisting of rosin modified with an alpha beta unsaturated organic polybasic acid and a terpene hydrocarbon of the formula $C_{10}H_{16}$ modified by an alpha beta unsaturated organic polybasic acid, whereby said water tolerance is maintained, printing characteristics are improved, and spoilage on storage is prevented.

2. A non-offsetting printing ink having a high water tolerance comprising a varnish comprising a liquid polyglycol as a solvent for the resin, and a resin selected from the group consisting of rosin modified with an alpha beta unsaturated organic polybasic acid and a terpene hydrocarbon of the formula $C_{10}H_{16}$ modified by an alpha beta unsaturated organic polybasic acid and in sufficient amount to form, when subjected to steam immediately after printing, a thin hard film of resin over the exposed surfaces of the printed film, and a pigment comprising alkali blue resinated with a resin selected from the group consisting of rosin modified with an alpha beta unsaturated organic polybasic acid and a terpene hydrocarbon of the formula $C_{10}H_{16}$ modified by an alpha beta unsaturated organic polybasic acid, whereby said water tolerance is maintained, printing characteristics are improved, and spoilage on storage is prevented.

DONALD ROBERT ERICKSON.
PAUL J. THOMA.